(12) United States Patent
Sivaraman et al.

(10) Patent No.: US 12,211,308 B2
(45) Date of Patent: Jan. 28, 2025

(54) MULTI-MODAL SENSOR FUSION FOR CONTENT IDENTIFICATION IN APPLICATIONS OF HUMAN-MACHINE INTERFACES

(71) Applicant: Nvidia Corporation, Santa Clara, CA (US)

(72) Inventors: Sakthivel Sivaraman, Sunnyvale, CA (US); Nishant Puri, San Francisco, CA (US); Yuzhuo Ren, Sunnyvale, CA (US); Atousa Torabi, San Jose, CA (US); Shubhadeep Das, Kolkata (IN); Niranjan Avadhanam, Saratoga, CA (US); Sumit Kumar Bhattacharya, Pune (IN); Jason Roche, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 655 days.

(21) Appl. No.: 17/462,833

(22) Filed: Aug. 31, 2021

(65) Prior Publication Data
US 2023/0064049 A1  Mar. 2, 2023

(51) Int. Cl.
| | |
|---|---|
| G06V 40/10 | (2022.01) |
| G06F 3/01 | (2006.01) |
| G06F 16/632 | (2019.01) |
| G06T 7/73 | (2017.01) |
| G06T 15/06 | (2011.01) |

(52) U.S. Cl.
CPC ............ *G06V 40/107* (2022.01); *G06F 3/013* (2013.01); *G06F 16/632* (2019.01); *G06T 7/73* (2017.01); *G06T 15/06* (2013.01); *G06T 2207/10028* (2013.01)

(58) Field of Classification Search
CPC ......... G06V 40/107; G06T 7/73; G06T 15/06; G06T 2207/10028; G06F 16/632; G06F 3/013
See application file for complete search history.

(56) References Cited

U.S. PATENT DOCUMENTS

| | | | |
|---|---|---|---|
| 2005/0288935 A1* | 12/2005 | Lee | G10L 15/26 704/E15.045 |
| 2013/0106682 A1* | 5/2013 | Davis | G06F 3/0304 345/156 |
| 2014/0337370 A1* | 11/2014 | Aravamudan | G10L 15/22 707/759 |
| 2018/0302602 A1* | 10/2018 | Chen | H04N 21/44008 |

* cited by examiner

*Primary Examiner* — Pinalben Patel
(74) *Attorney, Agent, or Firm* — Hogan Lovells US LLP

(57) ABSTRACT

Interactions with virtual systems may be difficult when users inadvertently fail to provide sufficient information to proceed with their requests. Certain types of inputs, such as auditory inputs, may lack sufficient information to properly provide a response to the user. Additional information, such as image data, may enable user gestures or poses to supplement the auditory inputs to enable response generation without requesting additional information from users.

20 Claims, 13 Drawing Sheets

MULTI-MODAL SENSOR FUSION FOR CONTENT IDENTIFICATION IN APPLICATIONS OF HUMAN-MACHINE INTERFACES

BACKGROUND

Sensors, such as video cameras, microphones, etc. may be used to monitor a variety of locations and provide data for analytics processing. These sensors may be integrated with artificial intelligence systems to provide interactive content for users, such as assistants to facilitate sale transactions. Users may interact with these systems by asking questions and receiving responses. However, users often provide insufficient information, making it difficult for these systems to provide responses without obtaining additional information. When users either receive insufficient information, or the system asks for additional information to provide an answer, the user may become frustrated and stop using the system.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide systems and methods for improving information provided by virtual assistants or other artificial intelligence systems to users. In various embodiments, these systems may be deployed in public spaces, such as a retail space, and are calibrated to interact with several different and potentially previously unknown users. Due to a location of these systems, information specific for users may be unavailable, and as a result, user queries may provide all or substantially all of the information for providing responses to users. Embodiments include a dialogue system to receive auditory information, such as voice commands or prompts, and a visual system to provide additional information when the auditory information provided by a user is insufficient. For example, systems may use information from the visual system to detect an entity associated with a user query to a virtual assistant. The dialogue system may include a variety of natural language processing techniques to identify queries presented by users, determine a user's intent, determine an entity associated with the intent, and then reply to the user. In situations where additional information is needed, such as to identify an item the user is asking about, the visual system may provide additional tools to identify a user's pose or gestures. The user's pose may be associated with a user pointing to something and the system can draw a ray between locations on the user and extend the ray to attempt to intersect one or more recognized items. Additionally, the user's pose may be associated with a user holding an item or object, and the item within the user's hand may be identified and used to respond the query. Various embodiments may include a variety of sensors for the visual system, which may include both two-dimensional (2D) and three-dimensional (3D) sensors.

Figure 1:
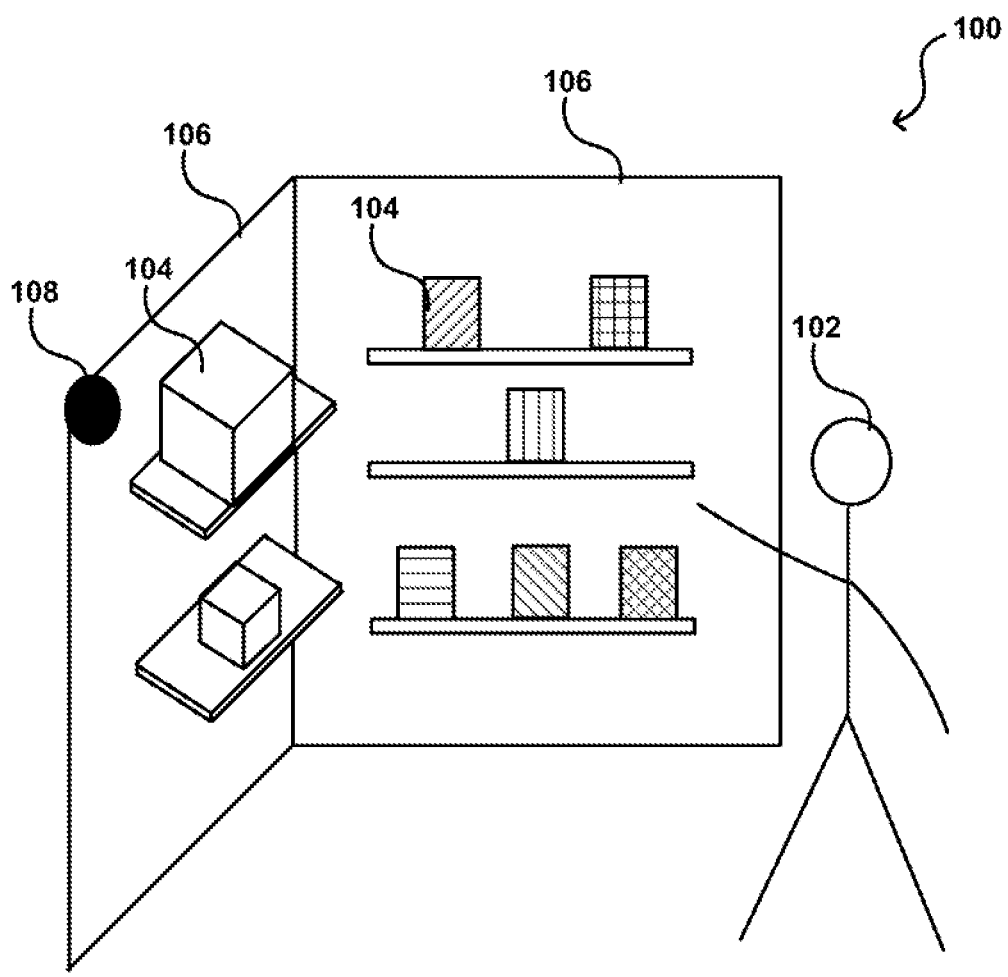
FIG. 1 illustrates an example of an environment including an object identification system, according to at least one embodiment.

A physical space 100, such as a retail space, is illustrated in FIG. 1 that includes a user 102 interacting with one or more items or products 104, which may be for sale. Use of a retail space is provided for example purposes only and it should be appreciated that various other applications of the present disclosure may not be associated with a retail space, such as information kiosks, conventional halls, campuses industrial environments, and the like. In this example, the items 104 are closely positioned to one another, for example, along shelving units 106 that may include multiple items 104 on a common shelf. The user 102 may also interact with an artificial intelligence ("AI") assistant AI assistant 108, which includes one or more sensors, such as a camera, which may include a distance sensor, microphones, radar sensors, and motion sensors, among other potential sensors. The user 102 may be able to interact with the AI assistant 108 by providing a word or phrase to obtain the attention of the AI assistant 108 or by moving within a field of view to either activate the motion sensor or be recognized by the AI assistant 108. In one or more embodiments, the AI assistant 108 may provide a prompt, for example on a screen, requesting an input or query from the user 102. By way of example, the user 102 may ask the AI assistant 108 a question, such as a question related to one or more of the products 104.

In at least one embodiment, the user 102 may present the question in a manner that does not provide sufficient information for the AI assistant 108 to provide a response. Typically, the AI assistant 108 may require at least a user's intent for the query and also an entity the intent is focused on. By way of example, the user 102 may ask the AI assistant 108 "How much does the Brand A camera cost?" In this example, the AI assistant 108 may infer the intent as being related to price and the entity being the Brand A camera. However, problems may arise when there are multiple Brand A cameras. For example, Brand A Model 1 and Brand A Model 2 may have different prices. Accordingly, the AI assistant 108 may ask the user 102 for additional information, such as requesting the model. In cases where model numbers are complex or there are a large number of items, the user 102 may grow frustrated and no longer wish to use the AI assistant 108.

In another example, the user 102 may speak to the AI assistant 108 in a way that provides even less information. For example, the user 102 may point to an item 104 and ask "How much does that cost?" In this example, the AI assistant 108 may not have information to infer what "that" refers to, and as a result, may need to ask the user additional questions, reducing the user's satisfaction with the system. Systems and methods of the present disclosure may be directed toward identification of the intent or entity based, at least in part, on a user's pose or orientation at the time of or near the time of the input query. As will be described below, with the example of "How much does that cost?" systems and methods may be directed toward identifying a lack of information (e.g., lack of an entity), acquiring data from an alternative sensor, such as a camera, identifying a pose of the user, and generating a vector, based at least in part on the pose, to infer the entity.

By way of example, a query may be evaluated by a rules base approached to determine whether one or more slots are filled from the words forming the query. The slots may correspond to an intent that is directed toward a goal of the query, such as asking how much something costs (intent: price), asking where an item or place of interest is located (intent: location), or asking if an item is in stock or an entity or service is available (intent: availability). This intent may be directed toward one or more entities. Because many artificial intelligence (AI) systems are designed to enable users to freely and openly communicate, a user may not realize that they are not providing sufficient information, such as by using indirect words (e.g., a definite article, a pronoun, an adjective, etc.). However, the system may infer the entity using additional information, such as the user's gaze, whether the user is pointing to the item, whether the user has touched or interacted with an item, or whether the user is holding an item. Accordingly, receiving information beyond the initial auditory input may enable the system to address the user's query without asking the user for additional information.

Figure 2A:
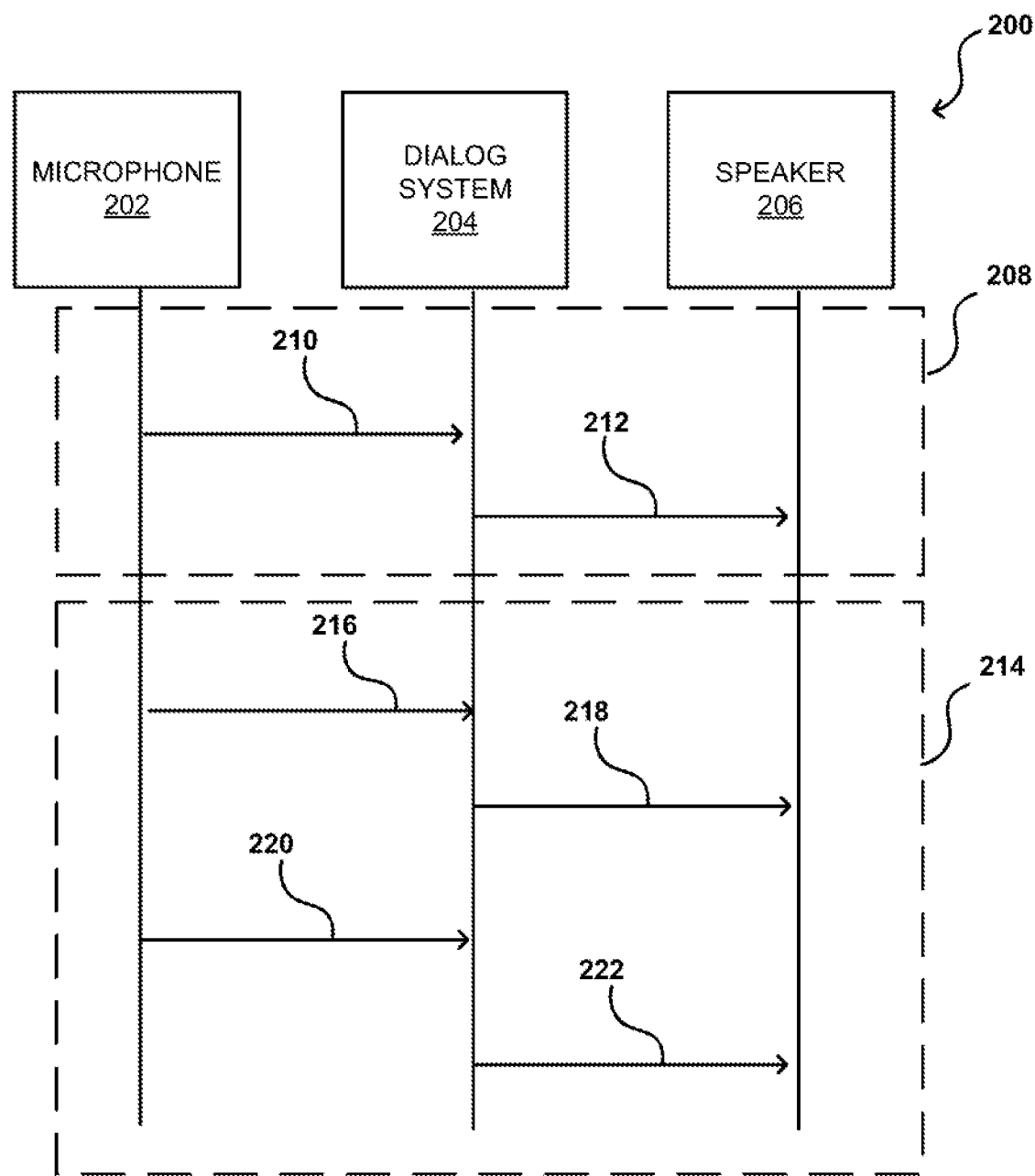
FIGS. 2A and 2B illustrate example process flows for query response system, according to at least one embodiment.

FIG. 2A illustrates a sample system flow 200 for a user's interaction with one or more features of a AI assistant (e.g., an artificial intelligence system). In at least one embodiment, the illustrated sample flow 200 is directed toward a system that utilizes an auditory input received from a user, such as an input query. One or more components, such as a microphone 202, may receive an input from a user. The input may then be processed using one or more conversational AI systems, which may also be referred to as a dialog system 204. In one or more embodiments, these systems may include systems for automatic speech recognition (ASR), natural language processing (NLP) or natural language understanding (NLU), or text-to-speech (TTS). It should be appreciated that various different deep learning models may be utilized to build the conversational AI system, including but not limited to, Wav2letter, Deepspeech, LAS, Jasper, Wavenet, Tacotron, Deep Voice1, or Deep Voice 2. Furthermore, one or more tools or services may also be utilized, such as Neural Modules (NeMo), Tensor RT, or NVIDIA Riva.

In operation, an input query is received at the microphone 202 and processed using the dialog system 204. Thereafter, a speaker 206 may be used to provide an answer, or request clarification from the user. In the illustrated flow 200, a first operation 208 is illustrated by a user query 210 received at the microphone 202. Information is then transmitted for processing to the dialog system 204, and if sufficient information is identified, the dialog system 204 provides a response 212 at the speaker 206. By way of example, the first operation 208 may include the user query 210 corresponding to a question such as "What is the price of this 32-inch Brand A TV?" The dialog system 204, using one or more of the systems noted above, may process the query and transmit the response 312 "The 32-inch Brand A TV is $100" to the speaker 206. In this example, the query 210 included both an intent and an entity. That is, the intent is the price and the entity is the specific 32-inch Brand A TV.

In a second operation 214, an input query 216 does not include both the intent and entity, and as a result, the dialog system 204 generates a follow up query 218. By way of example, the input query 216 may correspond to "How much is this?" The dialog system 204 may not be able to determine an entity, but may be able to infer that the user is asking about price. Accordingly, the dialog system 204 generates the follow up query 218, which may correspond to "May I know for which product?" or "What product are you asking about?" The user may then present a second input query 220, such as "32-inch Brand A TV." Now that the dialog system 204 can determine the entity, a response 222 may be generated and played by the speaker 206, such as "The 32-inch Brand A TV is $100." Systems and methods of the present disclosure may be directed toward eliminating the second set of interactions from the second operation 214 such that the intent and/or entity may be inferred based on other sensor information, such as a user's pose obtained from image information acquired with a threshold time of the input query.

Figure 2B:
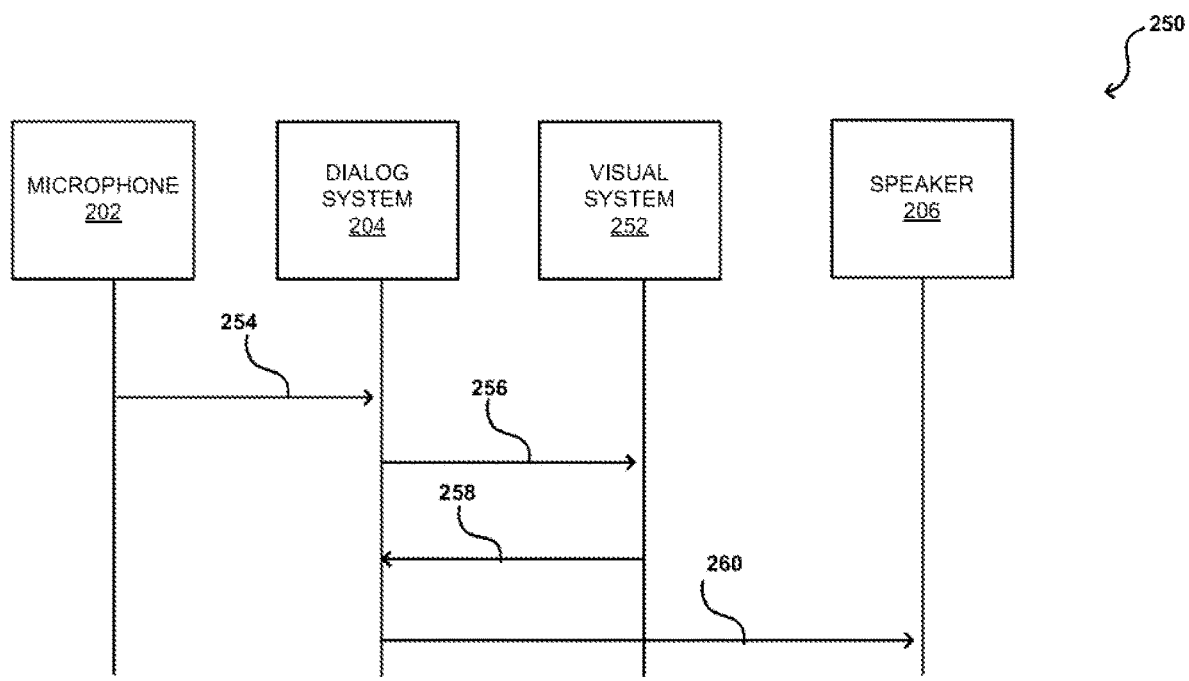

FIG. 2B illustrates a sample flow 250 that incorporates a visual system 252 to resolve and/or overcome drawbacks with dialog systems alone where the user does not provide sufficient information for an AI system to respond to a query. In this example, the user still provides a query 254 to the microphone 202, which is transmitted to the dialog system 204, as described above. The dialog system 204 processes the information to determine whether a threshold quantity of information is received to provide a response, such as providing both an intent and an entity, among other potential factors. Returning to the example of a query of "How much is this?" the dialog system 204 may determine that "this" is unknown, and as a result, sufficient entity information is not provided to provide a response to the user's query. Responsive to the determination, the dialog system 204 may transmit a request 256 to the visual system 252 to resolve or otherwise address the missing information. In this example, the visual system 252 may include one or more object recognition networks that may be useful for identifying one or more items associated with the user's query as well as one or more features of the user, such as a user pose. In at least one embodiment, systems such as NVIDIA DeepStream may be used to collect information, identify feature points, and estimate or detect various objects within visual data. Accordingly, the visual system 252 may determine one or more objects from a sensor, such as a camera, to identify what "this" refers to in the user query. As will be described, identification may include determining a user's pose, determining the user is pointing, generating a vector to extend the user's point, and then determining one or more intersecting objects with respect to the vector to determine the entity. A response 258 may then be provided to the dialog system 204, which may use the information to generate a response 260 for the user via the speaker 206. In this manner, additional information is not obtained directly from asking the user a question, but rather, is inferred from the user's actions at the time of or near the time of the query. For example, the user may point while asking the question. Additionally, the user may have touched an item a threshold number of times prior to asking the question. Such information may provide sufficient detail to supplement the original auditory query.

Figure 3:
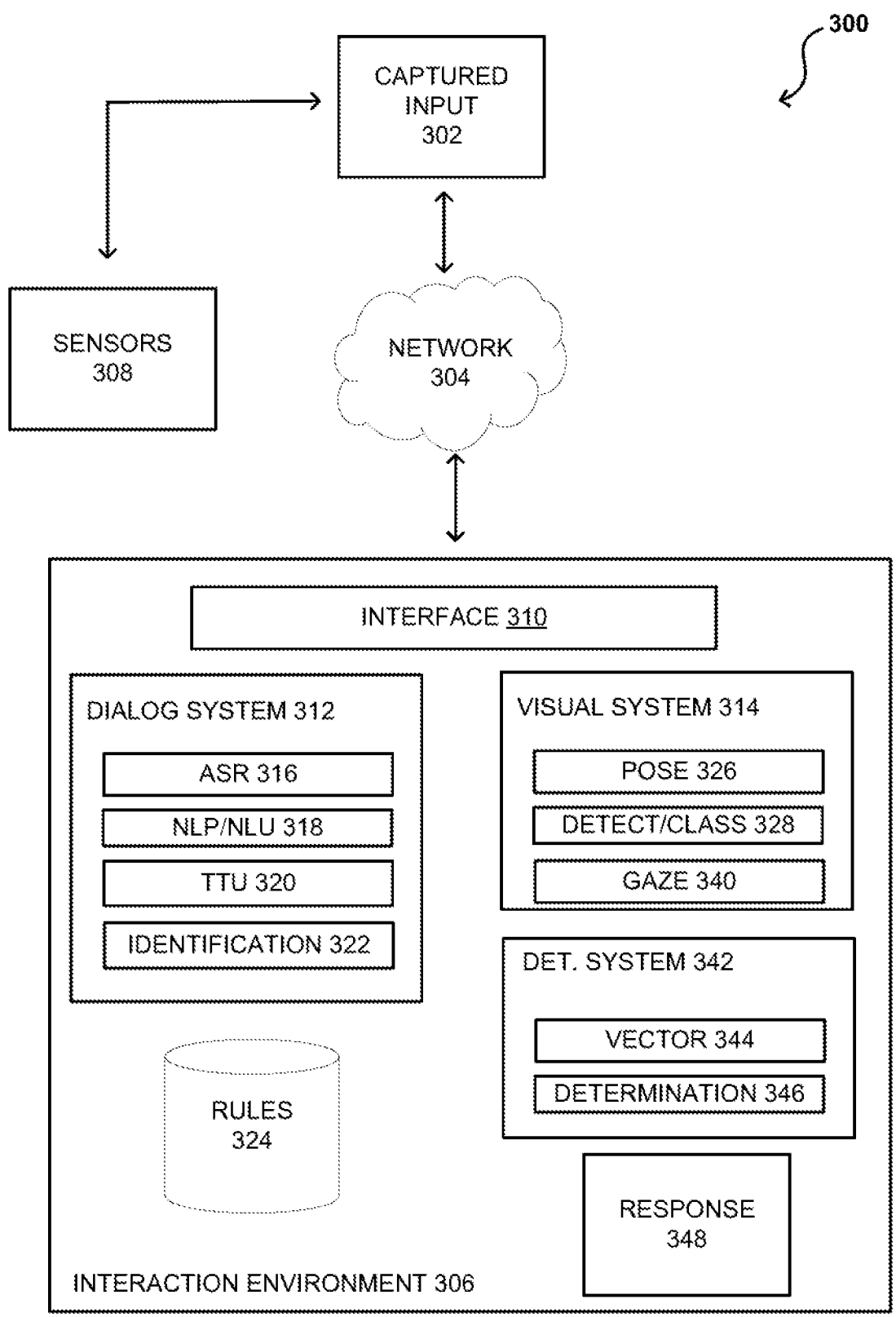
FIG. 3 illustrates an example environment for an object identification system, according to at least one embodiment.

FIG. 3 illustrates a schematic diagram of an example of an interaction system 300 for integrating information from one or more additional sensors if a first query provides insufficient information. In at least one embodiment, the system 300 can be utilized to receive a query, such as an auditory query, to analyze the query to identify components of the query, such as an intent and an entity, to determine whether sufficient components are provided, to request additional information from additional systems and sensors, and to provide a response to the query.

In this example, a captured input 302 is transmitted over a network 304 and provided to an interaction environment 306. It should be appreciated that various features and components are shown as being hosted within the same environment for convenience only and that these systems may be separately hosted or provided, for example with different distributed computing systems. Moreover, additional features or components may also be included, such as support systems, machine learning systems, databases, and the like. In various embodiments, the captured input 302 is received from one or more sensors 308 associated with the system 300. By way of example, the sensors 308 may include auditory sensors (e.g., microphones), visual sensors (e.g., video cameras, two-dimensional image sensors, three-dimensional image sensors, RGB/IR sensors, radars, etc.), or various other sensors. It should be appreciated that the sensors 308 may be calibrated and data acquired by the cameras may also include metadata that includes one or more sensor properties, such as either intrinsic or extrinsic properties. Extrinsic properties may include a position, pose, or orientation of the sensor (e.g., height, location within a physical space, direction the sensor is facing, etc.). Intrinsic properties may include properties of the assemblies, including, for example, a sensor size, focal length, etc.

In certain embodiments, data received from the sensors 308 may be acquired in real or near real-time (e.g., without significant delay), such as a stream of data, or may be collected over a period of time and then provided to the environment 306. In at least one embodiment, data from the sensors 308 may be provided on an as-needed basis. That is, data may be provided responsive to one or more requests for the information. As will be described below, in an example where the captured input is a user query, if auditory data is sufficient to enable the environment 306 to generate a response to the query, bandwidth may be saved by not transmitting other data associated with the auditory data, such as visual information. Accordingly, in various embodiments, data may be marked or otherwise tagged with information, such as a time stamp, to enable subsequent requests to provide additional information, as needed, and to correlate that data with alternative data provided at or near the time of the query.

An interface 310 is shown to receive and direct the information to appropriate locations. The interface 310 may include an API that a user may gain access to, for example via an authorized account, that may be integrated into one or more systems being utilized by a provider. For example, a provider may be a store operator that includes AI assistants for users to interact with throughout the store in an effort to improve user satisfaction.

In operation, a pipeline for interaction with the assistant may include one or more systems, as described above. These systems may correspond to one or more modules that include memories or processors to execute software instructions. It should be appreciated that the memories and processors may be dedicated to the system or be part of a distributed computing environment or a virtual machine that is virtualized within a shared data center. Moreover, in at least one embodiment, the software instructions may include a set of logical rules that are executed based, at least in part, on one or more sensor inputs. In various embodiments, various data architectures may be reused for one or more different purposes, and descriptions of an architecture with respect to a single system or component is not intended to limit the scope of the present disclosure. In this example, a dialog system 312 and a visual system 314 provide potential pipelines utilized to derive information from the one or more captured inputs 302 obtained from the sensors 308. It should be appreciated that these systems may execute separately or together, and may operate in parallel.

Regarding the dialog system 312, one or more components of the system 312 may be directed toward interacting with an auditory input received from the one or more sensors 308. A non-limiting example of an auditory input would be a question provided by a user, for example a query regarding one or more products or services for sale in a physical marketplace. In at least one embodiment, the dialog system 312 may include one or more machine learning systems that may utilized one or more deep learning architectures in order to evaluate an auditory input. By way of example, an ASR module 316, an NPL/NLU module 318, and a TTU module 320 are included within the dialog system 312. Each of these modules 316, 318, 320 may be a trained machine learning system that receives an input corresponding to an auditory query or command from a user. One or more of the modules 316, 318, 320 may analyze the auditory query to identify key words or phrases, extract certain parts of speech, classify different portions of the input, or the like. A set of inferences may be developed where the modules 316, 318, 320 predict or otherwise separate out salient portions of the auditory query to determine a response. In at least one embodiment, an identification module 322 may be a form of classifier that classifies parts of the auditory query, such as by identifying an intent of the user or an entity the user is associated with. The identification module 322 may further be utilized to determine whether sufficient information (e.g., information exceeding a threshold amount) is provided to enable a response to the query. For example, the identification module 322 may communicate with a rules data store 324, which may include one or more rules or steps for determining whether a slot or data component is filled (e.g., sufficient) and subsequent steps for proceeding if a slot is or is not filled. By way of example only, if a sufficient number of slots are filled, the rules associated with that query may proceed with generating a response based on the input, which may be only an auditory input. In another example, if a sufficient number of slots are not filled, the rules associated with that query may proceed with requesting additional data inputs in order to fill the slots.

In one or more embodiments, determination of the sufficiency of information provided by the user may correspond to determining whether the slots for an associated intent or entity are filled. That is, while analyzing the input query, different slots or requirements for a response may be populated. In certain embodiments, each slot may be populated in order to determine sufficient information, however, in other embodiments a percentage of slots or a set number may be deemed sufficient. If the slot is not filled, the identification module 322, or another system, may send a request to receive additional information in order to fill the slot without making another request to the user. For example, a confidence factor may be generated to determine a likelihood that the empty slot is filled or can be filled using only auditory information. If the confidence factor is below a threshold, additional data may be obtained.

In at least one embodiment, the visual system 314 may be utilized to fill in or otherwise provide additional information for the empty slot identified by the identification module 322. As noted above, one or more machine learning or computer vision systems may be utilized in order to identify the user providing the query. In at least one embodiment, user information is provided by a camera, which may be a still frame or a video, and the information may be streamed or provided responsive to the query from the identification module 322. In various embodiments, image data may correspond to a time when the query was presented. One or more systems may analyze the image data to determine information for filling in the slot, such as using a pose module 326 to determine a pose of the user. It should be appreciated that the pose module 326 may include one or more machine learning systems, which may include a trained neural network. In at least one embodiment, some pre-processing or augmentation of this image may be performed, such as to adjust a resolution, color depth, or contrast before processing. The network can be specifically trained for certain common poses or for certain types of users, which may include identification of key points or locations of the user, such as at joints. The pose module 326 can analyze the captured input 302 corresponding to image data and output, as a set of inferences, a set of estimated poses. In at least one embodiment, other inferences can be generated for locating feature points, such as a wrist, an elbow, hands, or the like.

Furthermore, the visual system 314 may further include a detection/classifier module 328. As noted above, the detection/classifier module 328 may include, or have access to, one or more trained machine learning systems, such as computer vision systems, that can be utilized to scan visual data, detect objects within the visual data, and then classify or recognize the items. By way of example, in an embodiment where the environment 306 is utilized with a store, one or more items detected by the detection/classifier module 328 may correspond to products for sale within the store. These objects may be detected by logos or artwork on packaging, by a location within the store relative to the sensors 308, or combinations of other methods. Detection may include identifying an object of interest within image data and then placing a bounding box around the item to signify a region of interest, as will be described below.

Additionally, the visual system 314 may also include a gaze detection module 340, which may be utilized to track or otherwise determine a user's gaze to determine one or more items, such as items associated with an entity in a query. For example, the user may provide a question, such as "How much is that?" and may then turn to look at an item. In one or more embodiments, the user's gaze may be determined at the time of the question, or shortly after, such that one or more vectors can be extended from the user's eyes corresponding to a gaze direction. It should be appreciated that one or more trained machine learning systems may be utilized with the gaze detection module 340, such as NVIDIA GazeNet, which may be part of a computer vision inference pipeline or TensorRT, as noted above. Accordingly, in one or more embodiments, the visual system 314 may be utilized to obtain additional information responsive to a determination that one or more slots from an input auditory query is insufficient.

In at least one embodiment, a determination system 342 may be utilized with information obtained from the visual system 314 in order to determine one or more objects of interest to identify the entity and/or intent of the user query, among other features. In this example, a vector generator 344 may be used to draw a vector extending from one or more locations of the user, based at least in part on the user's pose, which may be determined by the pose module 326. By way of example, a body pose estimator may detect a location, pose, and/or orientation of one or more body joints, such as a finger, wrist, elbow, etc. that corresponds to a point. A ray may then be computed to project from or near one or more of these joints. For example, a ray may extend from the wrist through the finger.

This ray may be extended until it interacts with or close to a bounding box corresponding to a region of interest that includes a detected item, as determined by a determination module 346. For example, when the ray intersects a region of interest corresponding to a detected item, is within a threshold distance of a detected item, or the like, then that item may be determined as the entity for the query. It should be appreciated that one or more rules from the rules data store 324 may also be utilized to resolve conflicts where the ray may intersect multiple items along a path or be close to multiple items. For example, if the ray intersects two items, a distance (proximity) to the item's center may be used to determine the appropriate item. Additionally, in certain embodiments, an order in which the items are intersected or a proximity of the item to the user may be utilized to determine a selection or determination. In certain embodiments, a temporal time window may be used to select the item which is being positioned at/held/touched most of the time. Furthermore, in embodiments where one or more items are partially occluded, rules may be established to determine how much occlusion enables the system to make a determination or determine whether further queries should be provided to the user for clarification.

As an example, when using 2D pose estimation, a 3D hand vector may be developed for a camera coordinate system with camera calibration information. A vector origin may be the "elbow" joint and may be extended to pass through the "wrist" joint (e.g., the vector starts at a point corresponding to the elbow and extends through a point corresponding to the wrist). Thereafter, object bounding boxes may be detected in 2D. Logic associated with hitting or otherwise selecting an object may be based on whether the ray at a current marching step is in the object's 2D region and the ray depth at a current step is bigger or equal to the depth of the point in a current position. In various embodiments, the ray has a starting point that is a threshold distance from an identified joint or point on the user, such as approximately 40 percent beyond the wrist. It should be appreciated that this value is provided by way of example only. If the ray does not intersect with an object in 3D, the ray may be extended until the end of the scene. In various embodiments, one or more Kalman filters are applied on the wrist or elbow joint (for 3D data) to avoid outliers that may occur in certain frames of image data. Additionally, embodiments may also apply hole filling and spatial filtering algorithms on every frame depth image before computing a point cloud. Furthermore, various embodiments may use depth estimation algorithms to estimate scene depth. Moreover, certain image data may enable 3D pose estimation and 3D object box estimation.

It should be appreciated that the pose and detection may also be associated with recognition that the user is holding or otherwise in contact with an item, and as a result, determining a vector may not be necessary. For example, the pose module 326 may determine that the user is holding an item, for example by identifying the hands in a certain orientation indicative of holding or supporting an item and by recognizing a region of interest around the hands associated with an item. Accordingly, the determination module 346 may infer that the item the user is holding is the entity associated with the query.

Upon determining each or a sufficient number of slots associated with the query, a response module 348 may generate a response for the user. For example, the response module 348 may be utilized to fill in each query and then use one or more portions of the dialog system 312 to generate an auditory response for the user, which may be played through speakers or presented on a screen. In one or more embodiments, a combination of methods may be deployed, such as both an auditory response and a visual response that shows the user the item in question and a response to their query, such as a price. Accordingly, systems and methods of the present disclosure may be utilized to fuse both audio and image data to provide responses to user queries in place of requesting additional information from the user. These systems may enable a decreased use of resources where it is determined that both auditory and image data is not necessary and may utilize one or more logical rules to determine how much additional information to obtain in order to respond to the query. By way of example, if it is determined image data is needed, but the pose estimator determines the user is holding an item, it may be determined that drawing or computing a vector is not necessary for the determination when an object the user is holding is identified.

Figure 4A:
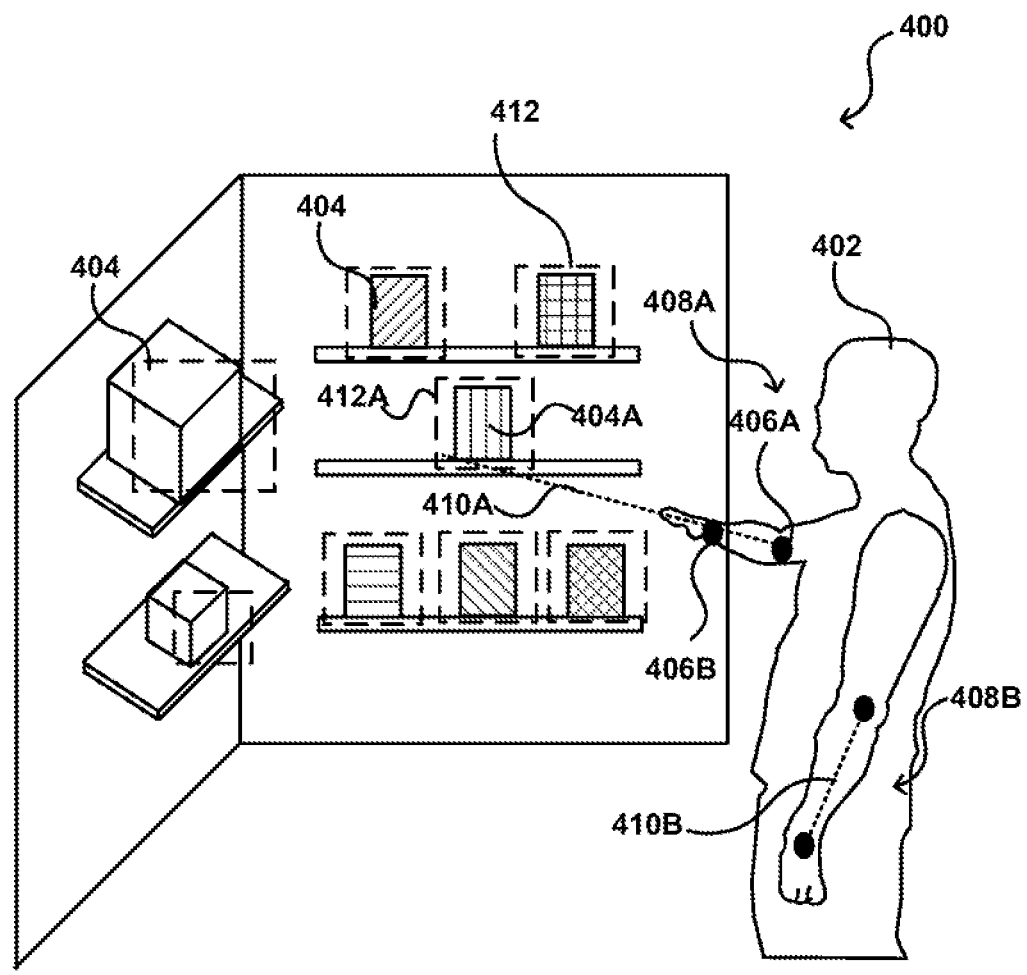
FIGS. 4A and 4B illustrate example environments including an object identification system, according to at least one embodiment.

FIG. 4A illustrates an example environment 400 using one or more systems of the present disclosure. In this example, a user 402 may provide an auditory query that does not include sufficient information to generate a response, such as a query that omits an entity. However, the user 402 may point to an item 404 while asking the question or soon after asking the question, such as by asking "How much does that cost?" In one or more embodiments, image data is acquired and a pose estimator determines a user pose, which in this example corresponds to pointing. One or more points 406 may be determined along the user 402. A first point 406A corresponds to an elbow and a second point 406B corresponds to a wrist. In this example, the user's arms are positioned such that a first arm 408A is doing the pointing while a second arm 408B is at the user's side. In various embodiments, the pose estimator may determine that the second arm 408B is not relevant and may focus on the first arm 408B. In other embodiments, vectors 410 may be drawn along each arm, where the vectors extend between the respective points 406A, 406B.

The vectors 410A, 410B are illustrated extending through the respective points 406A, 406B toward items 404, which are enclosed within bounding boxes 412. In this example, the vector 410A intersects the bounding box 412A, which may be determined as indicative of the user 402 pointing to the item 404A. In one or more embodiments, the information corresponding to the identified item 404A may be used to populate the empty spaces of the query, such as the entity, in order to enable the system to provide a response to the user's query. As noted above, in various embodiments, if multiple bounding boxes 412 are contacted, or if one is not contacted, other methods may also be utilized to infer the entity, such as a distance from an edge or center of the boxes, an order in which bounding boxes are contacted, or the like. Moreover, additional information, such as further incorporation with a gaze detector that includes a separate vector, may also be utilized to further identify the item 404.

It should be appreciated that systems and methods selected for determination of the item 404A may be based, at least in part, on the information acquired from the sensors. By way of example only, with 2D information, the ray may be extended between the wrist and elbow. However, with 3D information (e.g., depth information), a point cloud may be generated of the scene.

Figure 4B:
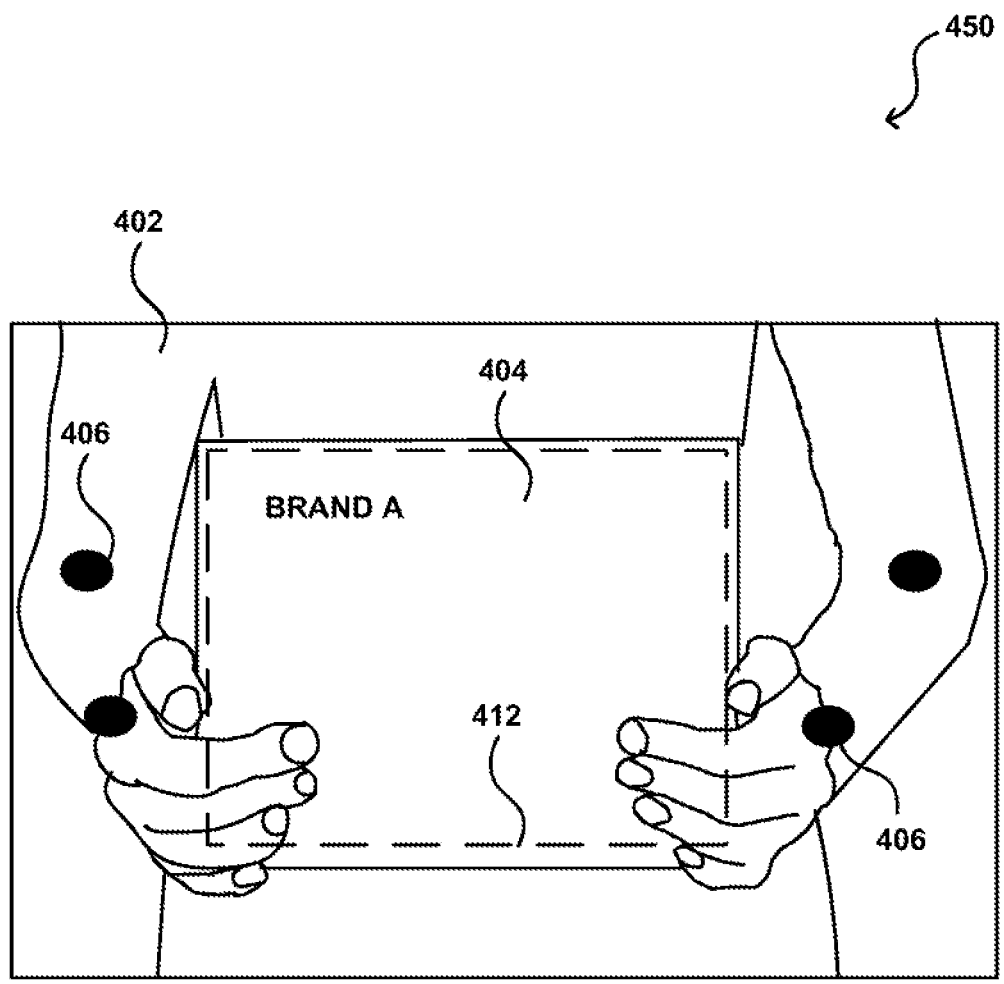

FIG. 4B illustrates an environment 450 where the user 402 is holding the item 404. In one or more embodiments, the points 406 are determined, which may facilitate identification of the user's pose. As shown, the user 402 is holding the item 404, and as a result, generation of one or more vectors may be unnecessary because the one or more rules may determine that an item 404 being held corresponds to the entity the user 402 is interested in. However, it should be appreciated that vectors may be generated in other embodiments. In this example, the bounding box 412 is arranged to identify the item 404, which may then be used to fill in the slot corresponding to an entity within the query, thereby enabling the system to provide a response to the user without asking the user additional questions.

Figure 5:
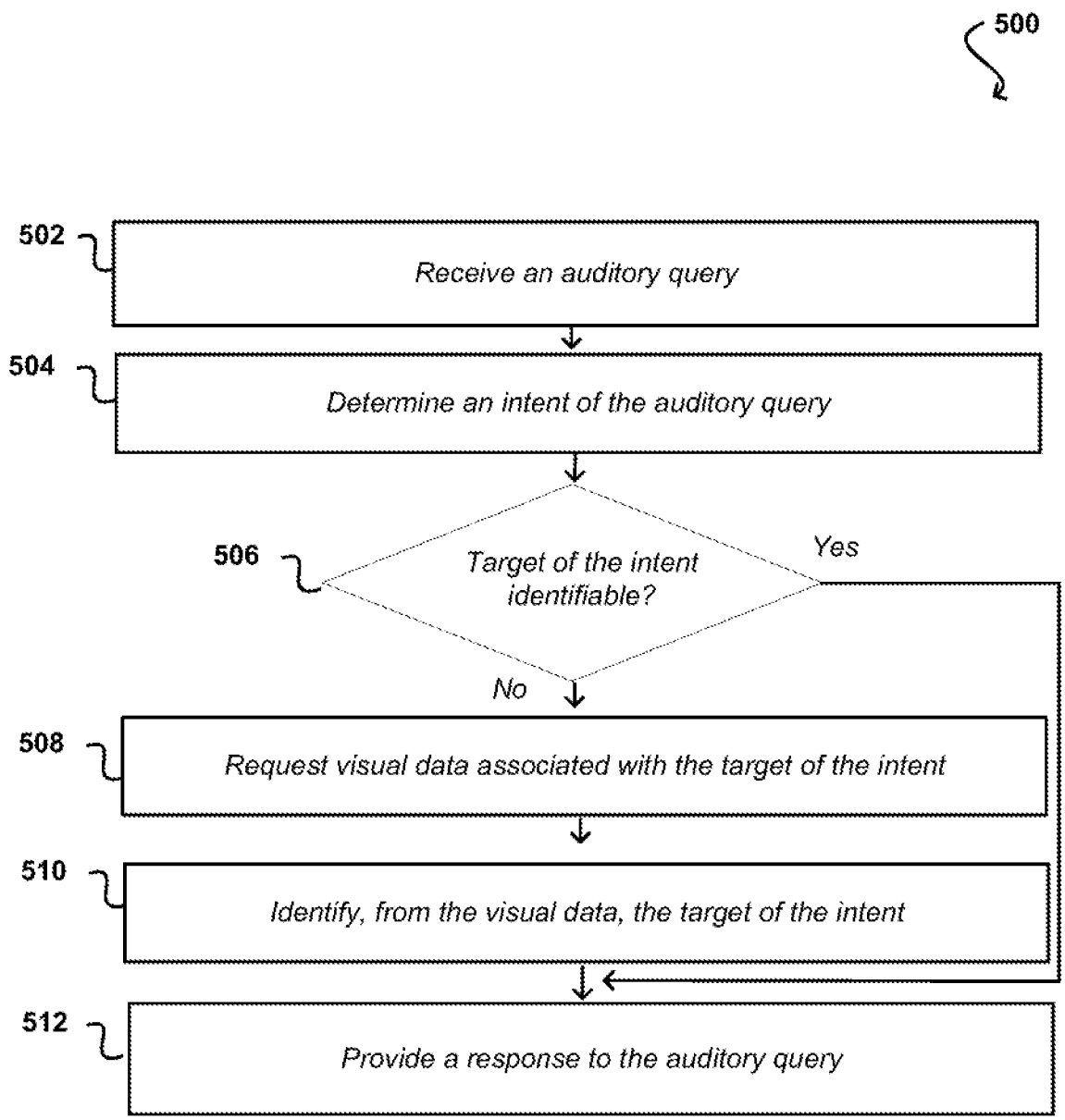
FIG. 5 illustrates an example flow chart of a process for responding to an auditory query, according to at least one embodiment.

FIG. 5 illustrates an example process 500 for responding to a user query. It should be understood that for this and other processes presented herein that there can be additional, fewer, or alternative steps performed in similar or alternative order, or at least partially in parallel, within scope of various embodiments unless otherwise specifically stated. In this example, an auditory query is received 502. For example, a user may interact with a virtual assistant and may pose a query that is received by a microphone. An intent of the query may be determined 504. The intent may correspond to a desire or a goal of the interaction, such as asking for directions, asking for a price, or the like. In at least one embodiment, as noted above, one or more dialog systems may be utilized to exact features from the text and identify relevant parts of speech in order to determine the intent. In one or more embodiments, it is determined whether a target of the intent is identifiable from the auditory query 506. For example, the target may correspond to an entity associated with the intent, such as a user asking for a price of an object or asking for directions to a particular location. In at least one embodiment, one or more rules may be applied to determine whether the target is identifiable, such as identifying parts of speech within the query, identifying words in the query against a database, or the like. If the target is identifiable, a response may be provided 512. If not, additional visual data may be requested 508. Visual data may correspond to 2D or 3D image data, such as images from a still camera or a video camera, which may also correspond to stored data or streaming data. In at least one embodiment, the visual data is associated with a time stamp of the time of the auditory query, with some threshold of time before or after to capture additional information or gestures from the user.

The visual data may be used to identify the target of the intent 510. As an example, a pose detector may be used to determine whether the user is pointing to an item or holding an item. Additionally, one or more machine learning systems may be deployed to identify items within regions of interest in the visual data. In at least one embodiment, the pose detector may determine the user is pointing at an item, and a vector may be drawn alone one or more joints of the user, extended, and then determined whether or not the vector intersects the region of interest of the item. Upon determination of the target of the intent, the response may be provided 512.

Figure 6:
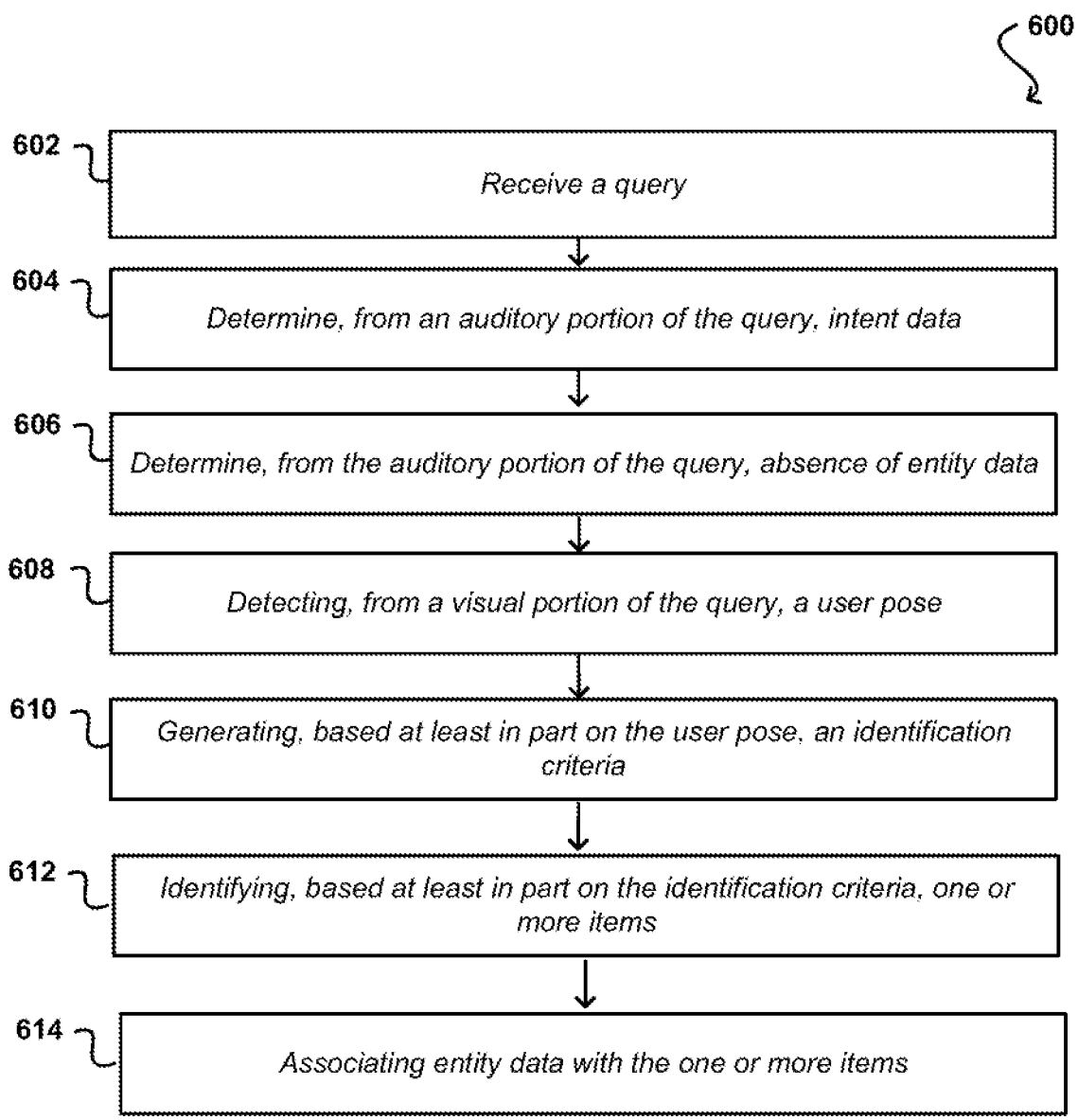
FIG. 6 illustrates an example flow chart of a process for responding to a query, according to at least one embodiment.

FIG. 6 illustrates an example process 600 for identifying an entity associated with an auditory query. In this example, a query is received 602. The query may include one or more components of data, such as auditory data, visual data, text data, or the combination thereof. By way of example, the user may provide a query to a system that includes a microphone to receive auditory data and one or more imaging devices to receive visual data. Intent data may be extracted from an auditory portion of the query 604. For example, a dialog system may use one or more machine learning techniques to analyze the query to determine relevant information for inferring an intent of the query. In at least one embodiment, absence of entity data within the auditory portion may be determined 606. By way of example, the user may pose the question using a gesture, such as pointing or nodding, rather than identifying an item by name.

In at least one embodiment, a user pose is detected within a visual portion of the query 608. The pose may correspond to the user's gestures or actions at or near a time when the query was presented, such as whether the user is pointing when asking the query or holding an item while asking the query. Based at least in part on the pose, an identification criteria may be generated 610. The identification criteria may correspond to one or more rules to determine the entity associated with the query. In an example where the user is pointing, the identification criteria may correspond to whether a vector extending from the user's hand interacts with a region of interest associated with an item. In a further example where the user is holding an item or touching an item, the identification criteria may correspond to the item within the user's hands. One or more items may be identified based, at least in part, on the identification criteria 612. As a result, entity data for the query may be associated with the one or more items 614, and the system may provide a response to the user.

Data Center

Figure 7:
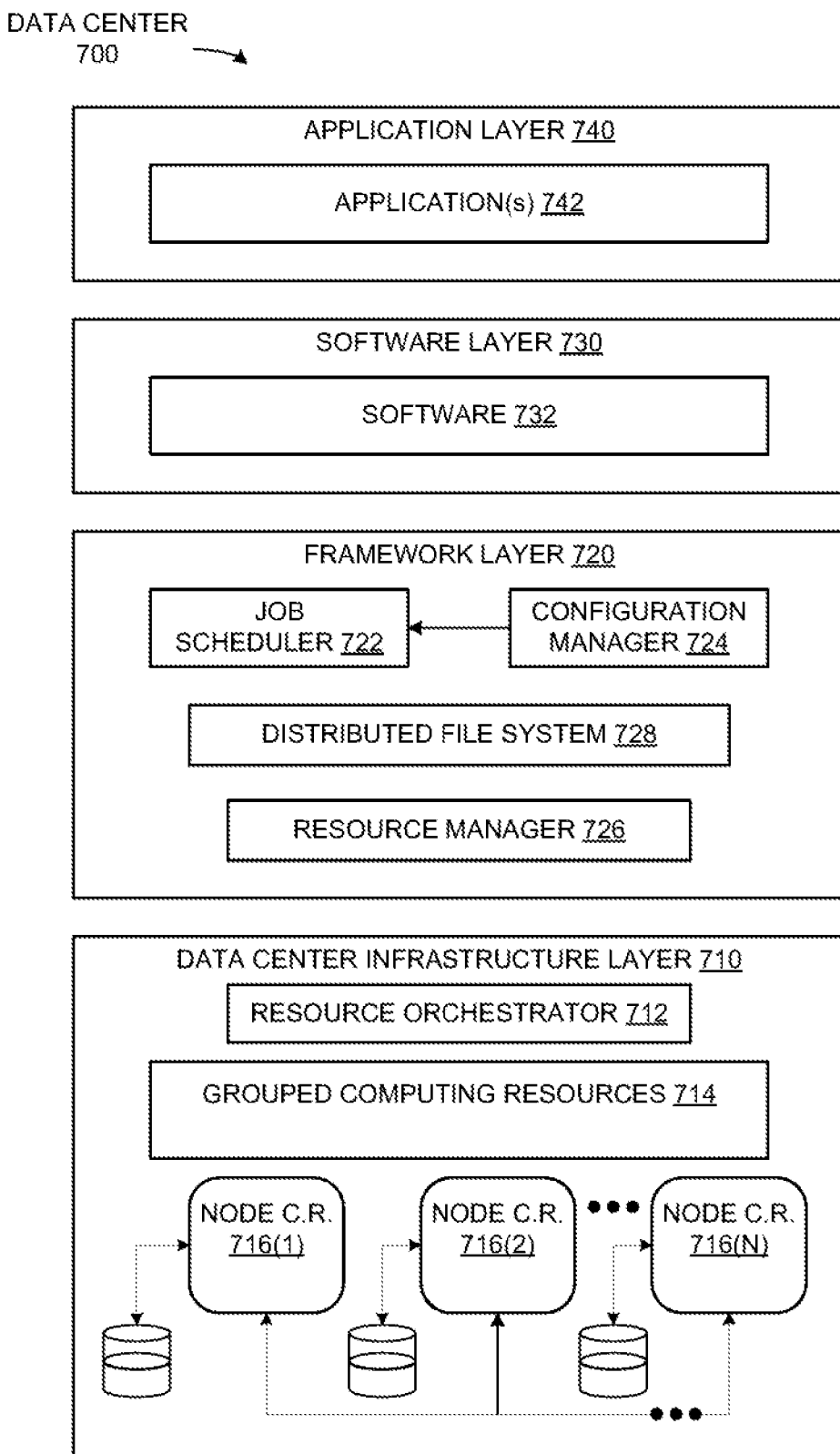
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for multi-modal sensor fusion.

Computer Systems

Figure 8:
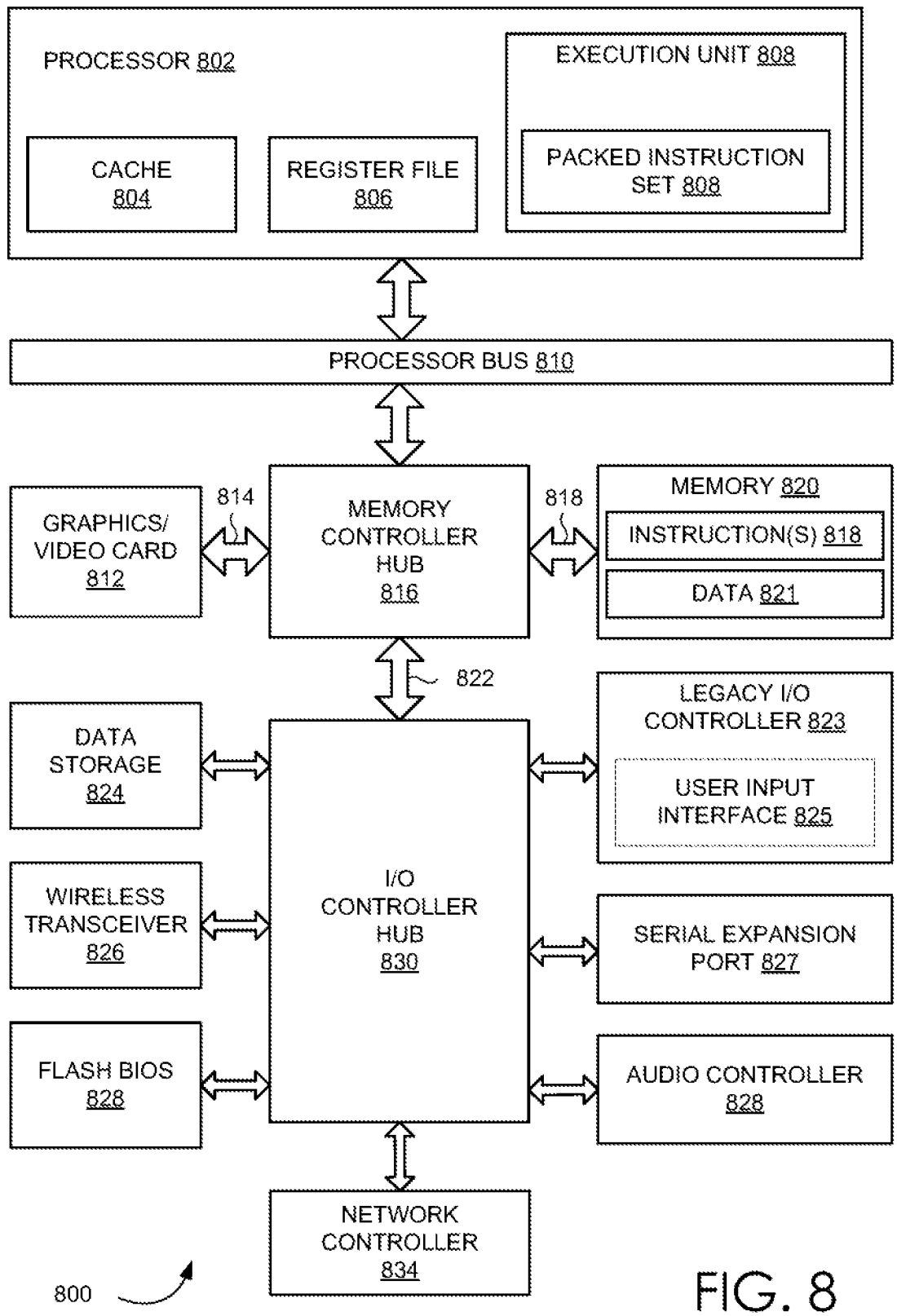
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for multi-modal sensor fusion.

Figure 9:
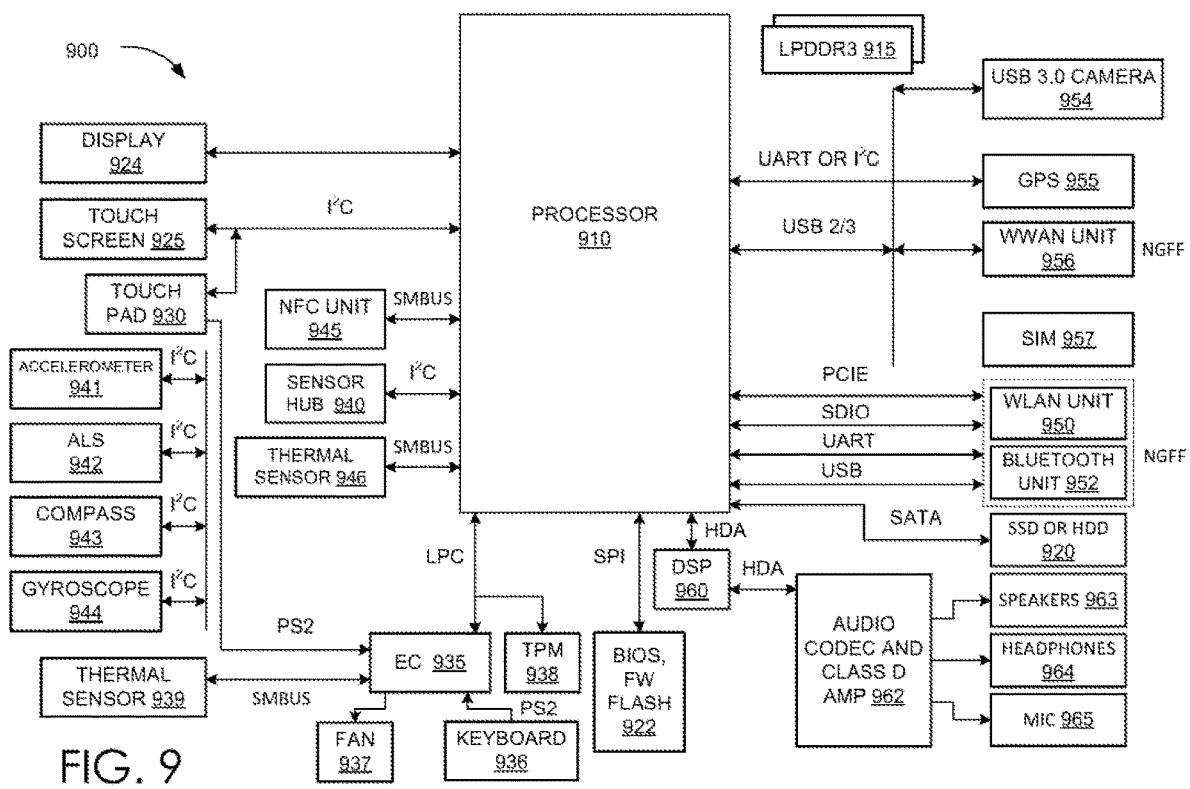
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for multi-modal sensor fusion.

Figure 10:
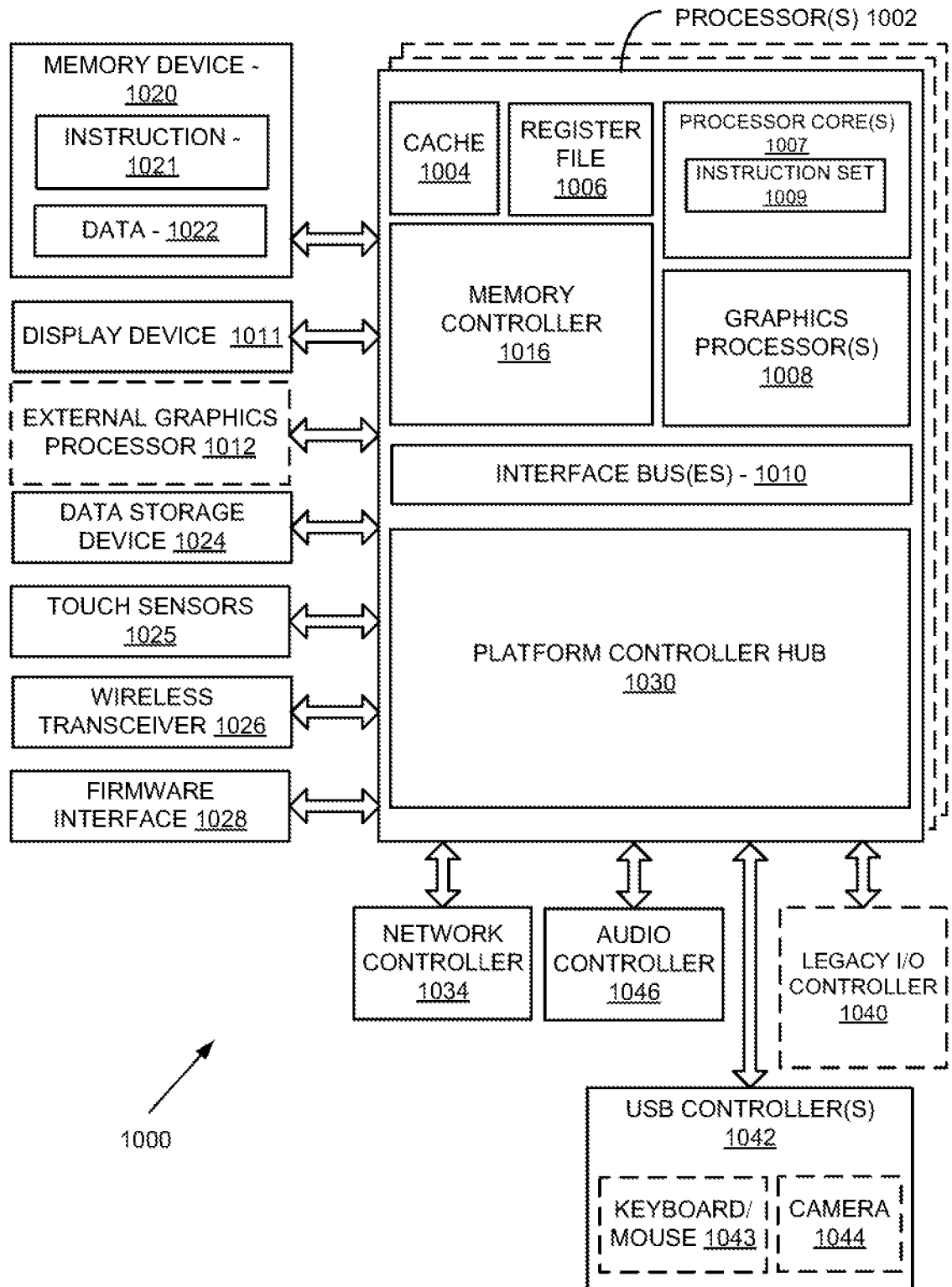
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for multi-modal sensor fusion.

Figure 11:
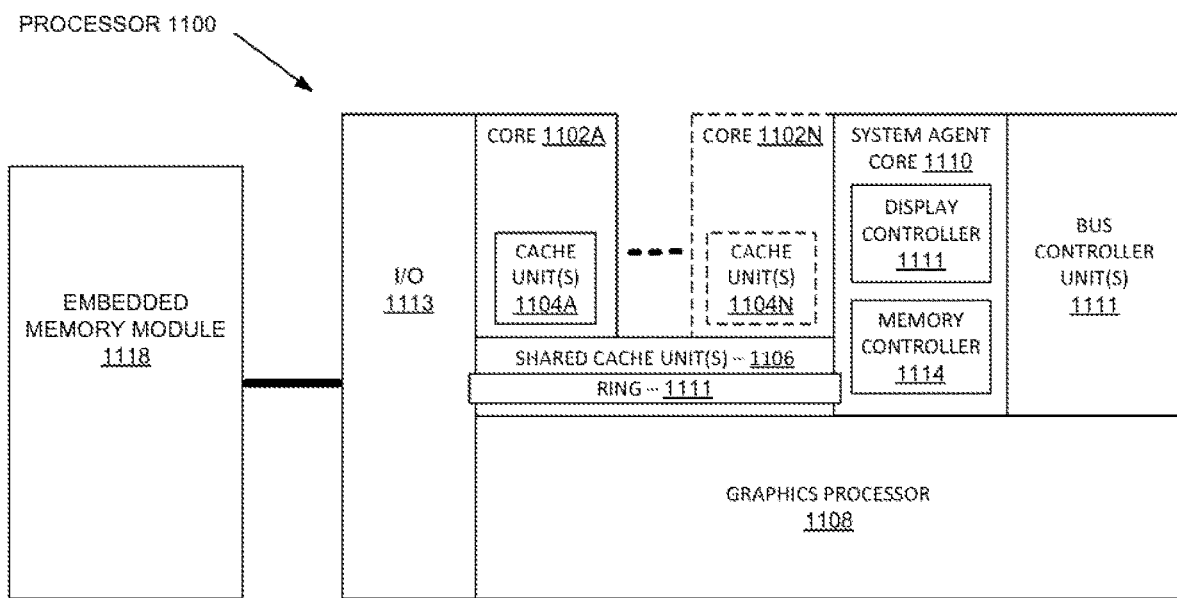
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for multi-modal sensor fusion.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving an auditory query;
determining an intent of the auditory query;
determining the auditory query provides insufficient information to identify an item associated with the auditory query;
requesting, responsive to the determination the audio query provides insufficient information, visual data associated with the item;
receiving the visual data;
identifying, based at least in part on the visual data, the item; and
providing a response to the auditory query.

2. The computer-implemented method of claim 1, further comprising:
determining a pose for a user in the visual data;
identifying a first point of the user and a second point of the user; and
generating a virtual ray projecting through the first point and the second point.

3. The computer-implemented method of claim 2, wherein the virtual ray intersects a region of interest associated with the item.

4. The computer-implemented method of claim 1, further comprising:
extracting, from the auditory query, the intent and an entity;
determining, based at least in part on an identification criteria, that the entity is not provided in the auditory query.

5. The computer-implemented method of claim 1, further comprising:
determining a pose for a user in the visual data;
identifying one or more appendages of the user; and
determining, based at least in part on a position of the one or more appendages, a pose corresponding to the user holding the item.

6. The computer-implemented method of claim 5, further comprising:
determining a confidence factor associated with the determination the auditory query provides insufficient information; and
determining the confidence factor is below a threshold.

7. The computer-implemented method of claim 1, wherein the auditory query is analyzed using at least one of automatic speech recognition (ASR), natural language processing (NLP), natural language understanding (NLU), or text-to-speech.

8. The computer-implemented method of claim 1, further comprising:
filling an intent slot using the intent extracted from the auditory query;
filling an entity slot using information associated with the item; and
processing the intent slot and the entity slot to generate a response to the auditory query.

9. The computer-implemented method of claim 1, wherein the image data is three-dimensional image data and the item is identified using a point cloud.

10. A method, comprising:
receiving, from a user in a commercial space, a query;
determining intent data for an intent slot is present within an auditory portion of the query;
determining entity data for an entity slot is absent from the auditory portion of the query;
detecting, based at least in part on visual data of the user, a user pose;
generating, based at least in part on the user pose, an identification criteria;
identifying one or more items, based at least in part on the identification criteria; and
filling the entity slot with entity data associated with the one or more items.

11. The method of claim 10, further comprising:
providing a response to the user, based at least in part on the intent data and the entity data.

12. The method of claim 10, further comprising:
determining the user pose corresponds to a pointing pose;
selecting a virtual ray for the identification criteria;
identifying a first location, associated with an elbow; and
identifying a second location, associated with a wrist, wherein the virtual ray projects through both the first location and the second location.

13. The method of claim 10, further comprising:
determining the user pose corresponds to a holding pose;
selecting an object recognition system for the identification criteria;
determining a first location, associated with user hands; and
determining one or more items at the first location.

14. The method of claim 10, further comprising:
determining the user pose corresponds to a looking pose;
selecting a gaze detection system for the identification criteria; and
determining one or more items associated with a gaze of the user.

15. The method of claim 10, further comprising:
requesting, responsive to determining the entity data for the entity slot is absent, the visual data, wherein the visual data corresponds to a time associated with the query.

16. A system, comprising:
an imaging device;
an audio device;
at least one processor; and
at least one memory, having instructions stored thereon, wherein the instructions, when executed by the processor, cause the system to:
receive, via the audio device, a query;
extract, from the query, a query intent;
determine, based at least in part on the query, a query entity is absent;
receive, from the imaging device, image data corresponding to a user submitting the query;
determining, from the image data, a pose of the user; and
identifying, based at least in part on the pose, the query entity.

17. The system of claim 16, wherein the pose corresponds to a user pointing and the instructions, when executed by the processor, further cause the system to:

identify a wrist of the user;
identify an elbow of the user;
generate a virtual ray extending from the wrist to the elbow; and
project the virtual ray in a first direction toward one or more identified items.

18. The system of claim 17, wherein the instructions, when executed by the processor, further cause the system to:
determine a distance between the one or more identified items and the virtual ray; and
select, based at least in part on the distance, the one or more identified items.

19. The system of claim 16, wherein the instructions, when executed by the processor, further cause the system to:
determine a response to the query; and
provide the response to the user.

20. The method of claim 16, wherein the image data corresponds to a time associated with the query, further comprising:
requesting first image data of the image data a first threshold amount of time before the time; and
requesting second image data of the image data a second threshold amount of time after the time.

* * * * *